US010255174B2

(12) United States Patent
Liu et al.

(10) Patent No.: US 10,255,174 B2
(45) Date of Patent: Apr. 9, 2019

(54) COMMON CACHE POOL FOR APPLICATIONS

(71) Applicant: SAP SE, Walldorf (DE)

(72) Inventors: Fangling Liu, Shanghai (CN); Xiao Zhi Yan, Shanghai (CN); Yingjie Weng, Shanghai (CN)

(73) Assignee: SAP SE, Walldorf (DE)

( * ) Notice: Subject to any disclaimer, the term of this patent is extended or adjusted under 35 U.S.C. 154(b) by 261 days.

(21) Appl. No.: 15/364,726

(22) Filed: Nov. 30, 2016

(65) Prior Publication Data

US 2018/0152438 A1   May 31, 2018

(51) Int. Cl.
  *G06F 21/62* (2013.01)
  *G06F 12/02* (2006.01)
  *G06F 21/00* (2013.01)

(52) U.S. Cl.
  CPC .......... *G06F 12/023* (2013.01); *G06F 21/00* (2013.01); *G06F 21/6263* (2013.01); *G06F 2212/1052* (2013.01)

(58) Field of Classification Search
  None
  See application file for complete search history.

(56) References Cited

U.S. PATENT DOCUMENTS 6,480,101 B1 *  11/2002  Kelly ................... G06K 7/0008
                                                    340/10.2
8,874,696 B1 *  10/2014  Daruwalla .......... H04L 67/1097
                                                    709/201
2005/0171983 A1 *  8/2005  Deo ................... G06F 17/30067
2007/0055837 A1 *  3/2007  Rajagopal ........... G06F 12/1475
                                                    711/163
2010/0179980 A1 *  7/2010  Montesdeoca ........ G06F 9/5016
                                                    709/203
2012/0079110 A1 *  3/2012  Brown ................ G06F 21/6281
                                                    709/225
2014/0344899 A1 * 11/2014  Kwon ..................... G06F 21/62
                                                    726/4
2015/0134913 A1 *  5/2015  Huang ................ G06F 12/0833
                                                    711/135
2016/0191499 A1 *  6/2016  Momchilov ........ H04L 63/0815
                                                    713/171
2016/0328175 A1 * 11/2016  Zhang ................... G06F 3/0644

* cited by examiner

*Primary Examiner* — Malcolm Cribbs
(74) *Attorney, Agent, or Firm* — Buckley, Maschoff & Talwalkar LLC

(57) ABSTRACT

A system having a common cache pool (CCP) includes a computing device having a plurality of applications executable on the computing device, each of the applications being in a particular application category, at least a first portion of the plurality of applications configured to utilize a cache. The CCP including a plurality of sub-caches associated with a respective particular application category, a sub-portion of applications associated with a sub-cache based on the particular application category, a first application of the sub-portion of applications accessing a first sub-cache when operated by a first user, and a second application of the sub-portion of applications, when operated by the first user, accessing the first sub-cache if the first application and the second application are of the same particular application category. A method to implement the system and a non-transitory computer-readable medium are also disclosed.

18 Claims, 3 Drawing Sheets

COMMON CACHE POOL FOR APPLICATIONS

BACKGROUND

Conventional approaches to application cache save user session data history to a local cache memory for each application. Session data history can include webpage access history, shopping history, news sites, click through activity, etc. Conventionally, the history data saved by one application cannot be accessed by another application, which is not an efficient use of memory resources; nor provide a user-friendly experience. Because individual local cache is reserved for each application, even when other applications might save identical data in their respective local cache, more memory is consumed in an inefficient manner.

What is needed in the art is a common cache that can be accessed (read and write) by different applications operating on the same computing device. Because users often access the same application suite from multiple, diverse devices, what is also needed is a common cache that can be accessed by the user from these diverse devices.

DETAILED DESCRIPTION

In accordance with embodiments, systems and methods can provide a common cache pool (CCP) so that application history usage information (e.g., user response to application queries, user webpage access, user online shopping history, user click through history, etc.) can be shared between different applications, and across different computing devices. The CCP can be implemented in a client computing device (e.g., personal computer, workstation, thin client, netbook, notebook, tablet computer, mobile device, etc.)

In accordance with embodiments, the history data saved by one application can be accessed by another application. Because the same application can be accessed by a user on different platforms, an embodying CCP eliminates the conventional approach of using an individual, local cache for each instantiation of an application. Additionally, under the conventional approach different applications often save duplicated information. Neither conventional approach is an efficient use of system resources. Embodying systems and methods result in a reduction of memory usage and other system resources.

Figure 1:
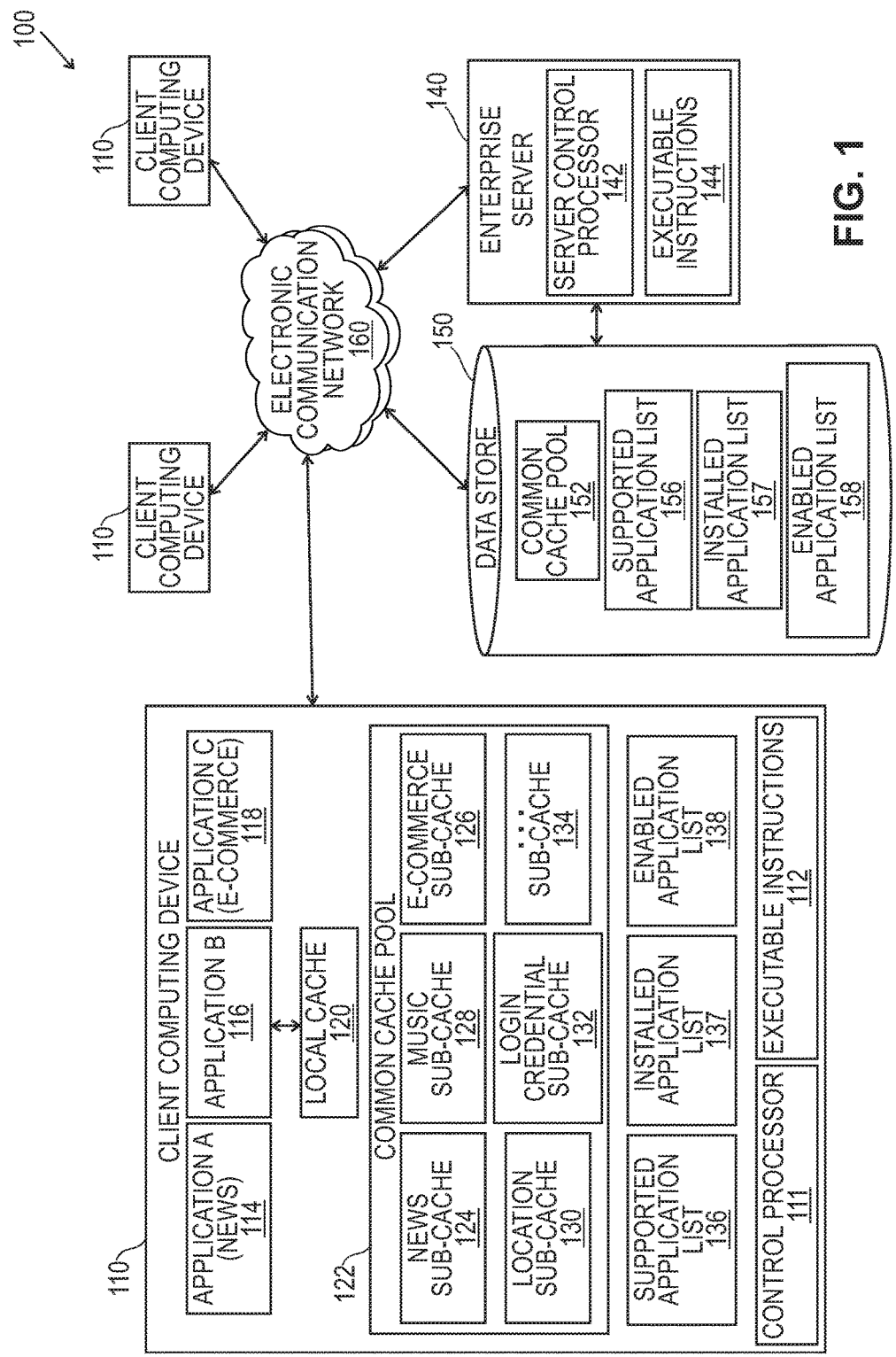
FIG. 1 depicts a common cache pool system in accordance with embodiments.

FIG. 1 depicts common cache pool system 100 in accordance with embodiments. An embodying system can include one or more client computing devices 110. The client computing device can be a computing device suitable for use by an end user in performance of the end user's purpose (e.g., personal computer, workstation, thin client, netbook, notebook, tablet computer, mobile device, etc.).

Client computing device 110 can include client control processor 111 that communicates with other components of the client computing device. Control processor 111 accesses computer executable instructions 112 that can be stored in memory within the client computing device. Client computing device can include multiple applications—for example, Application A 114 is a news application; Application C 118 is an e-commerce application; and Application B 116 can be directed towards other content.

In the illustrated example, Application B is not enabled to access common cache pool 122, accordingly Application B utilizes local cache 120. In accordance with embodiments, Application A and Application C are enabled to access the CCP.

CCP 122 can include multiple common sub-caches 124, 126, 128, 130, 132, 134. Each of the common sub-caches is associated with a type of application—for example, sub-cache 124 is associated with news applications; sub-cache 126 is associated with e-commerce applications; etc.

In accordance with implementations, there can be an overlap between application association to the sub-caches based on functionality. For example, each application can require login credential authentication prior to launch. Login credential sub-cache 132 can be a sub-cache where the login credentials for each application is stored. Authentication tokens, certificates, and the like could be stored within the login credential sub-cache.

Embodying systems and methods can implement a CCP in one client computing device or in a remote memory accessible to the client computing devices. System 100 can include multiple client computing devices 110. The individual client computing devices can access the CCP resident in one of the client computing devices using a decentralized communication network model (e.g., peer-to-peer). Communication between the client computing devices can be across electronic communication network 160.

The electronic communication network can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 160.

In accordance with embodiments, CCP 152 can be located in data store 150 that is in communication with the electronic communication network. Each of the individual client computing devices 110 would access the CCP resident in the data store. In this implementation, there would not be a CCP resident in a client computing device. Enterprise server 140 can include at least one server control processor 142 configured to support data store operations by executing executable instructions 144 accessible by the server control processor.

In accordance with embodiments, application A 114 can save its history data into the CCP news sub-cache 124, rather than at an individual local cache only resident at the local client computing device. Subsequently, when the same user launches an instantiation of application A at another client computing device, the history data stored in the CCP by application A (operating at the first client computing device) can be accessed by this latest instantiation of application A. By accessing the CCP, a user can re-access the same information (e.g., merchandise review, news source, electronic book, document, music, etc.), or exclude the same or similar information.

In some embodiments, the CCP can be implemented and enabled by a CCP install software suite that can itself be executed on the client computing device(s). After being enabled to access the CCP, the different applications (such as news applications) can save their history data into the same sub-cache. Elimination of individual local cache for each application solves the memory consuming requirements of the conventional approach.

In accordance with embodiments, different applications of the same nature can access the same CCP sub-cache—for example, e-commerce sub-cache 126 can be accessed by the same user whether online shopping using an application for Amazon.com or an application for Target.com.

In accordance with embodiments, the CCP can be implemented as an operating system feature that can be enabled by a configuration switch. The configuration switch can be a field in a configuration record and/or file.

Figure 2:
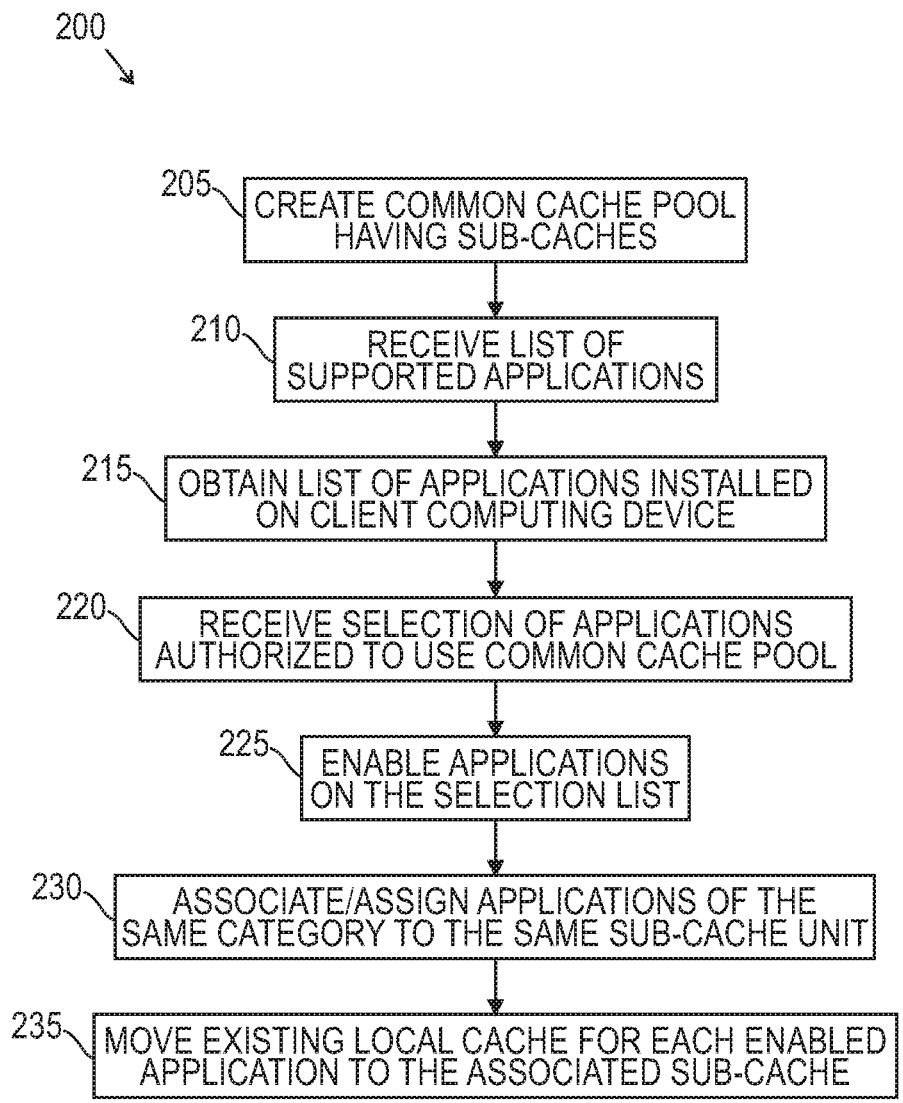
FIG. 2 depicts a flowchart of a process for associating applications to the common cache pool of FIG. 1 in accordance with embodiments.

FIG. 2 depicts common cache pool application association process 200 in accordance with embodiments. A common cache pool can be created, step 205, on the client computing device. As described above, the CCP can have one or more sub-caches.

The client computing device can receive, step 210, a list of supported applications 136. This list can come from an enterprise's system administrator, information technology staff, etc. The supported applications can be set by an information technology policy the enterprise maintains for uniformity among its users. A list of applications installed on the client computing device can be obtained, step 215. The list can be stored in installed application list 137 on the client computing device. In some implementations, the client computing device can scan itself to identify the current installed application list.

The client computing device can receive, step 220, a list of applications authorized to use the common cache pool. Installed applications that are authorized to access the common cache pool are enabled, step 225. Enabled application list 138 is generated by the enablement step.

The cache configuration of the enabled applications is changed to use the CCP. Applications of the same category (news, mapping, e-commerce, social media, etc.) are associated, step 230, to the same CCP sub-cache location. The sub-cache being assigned to the particular category of application. Data from existing local cache for each of the enabled application is moved, step 235, to the associated sub-cache within the CCP.

In accordance with embodiments, a daemon process can be running in the background. This daemon process can cause the execution of process 200 if it detects a new application's installation after the initial set up of the client computing device. In some implementations, the CCP along with the lists of supported, installed, and enabled applications can be resident on a data store accessible to the client computing devices across electronic communication network 160.

Figure 3:
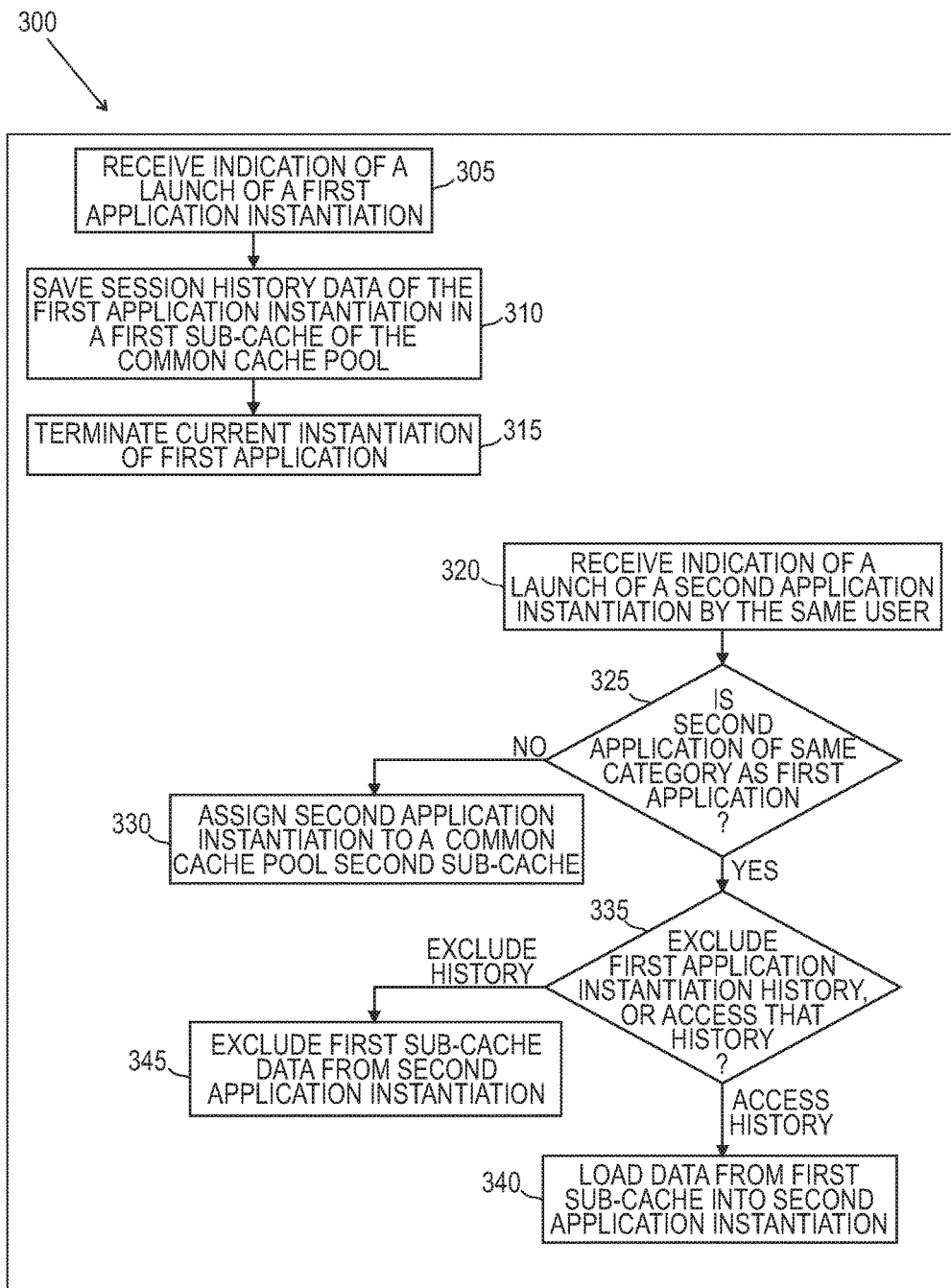
FIG. 3 depicts a flowchart of a process for securely granting applications access to the common cache pool of FIG. 1 in accordance with embodiments.

FIG. 3 depicts secure access process 300 for granting applications access to the common cache pool in accordance with embodiments. Because enabled applications save their session history data into the associated sub-caches of the CCP (based on an association between applications of the same category), a security protocol is implemented to grant access to the history data of the CCP. For example, news applications can only access the history data in an associated news sub-cache pool, and music applications can only access the history data in associated music sub-cache pool. An initial default security control policy can be provided by the enterprise staff. In some implementations, the end user can have the ability to customize the security control policy (without violating key elements).

An indication that an instantiation of a first application on enabled list 138 was launched can be received, step 305. Session history of this first application instantiation can be saved, step 310, in the sub-cache associated with the first application based on its category. A user can terminate, step 315, the first application instantiation at a point in time.

An indication that an instantiation of a second application on enabled list 138 was launched by the same user can be received, step 320. A determination can be made, step 325, as to whether the second application is of the same category as the first application. If not of the same category, a different sub-cache is assigned, step 330.

If of the same category, a determination can be made, step 335, as to whether the first application session history in the first sub-cache is to be excluded from (or accessed by) the second application. This determination can be made in accordance with an initial default behavior from a predetermined security policy. In some implementations, the determination can be made by providing the user with a selection displayed to the user on the client computing device. For example, by default a news application can exclude the history data (such as read news) of other news applications; or a shopping application can re-access the history of other shopping applications. The default access behavior can be customized by the user.

If the second application can access the first application history, data from the first sub-cache can be loaded, step 340, into the current instantiation of the second application. Else, the first application history is excluded, step 345, from the second application instantiation.

In accordance with embodiments, history data in the CCP sub-cache can have an expiration time. The expiration time can be set by a system administrator, or in some implementations by an end user. The expiration time can be different for specific types of history data and for particular sub-caches.

The CCP can also include a space limitation setting that limits the amount of system resource memory allocated to the CCP and the sub-caches. In accordance with implementations, a last-in-first-out paradigm can be followed to remove the oldest history data as the allocated space limitation is exceeded. A system administrator can customize the space limitation setting by sub-cache. Permission to set the space limitation can be provided to an end user. The implementation of an expiration time and/or a space limitation provides a boundary on the allocation of system resources available to the CCP.

In accordance with embodiments, not only are system resources used more efficiently, but also a user's experience is enhanced and streamlined by accessing session history data between applications of the same category. For example, suppose a user has two e-commerce applications (e.g., eBay and Amazon) installed on their client computing device (e.g., a smart phone). Price comparison can easily be achieved without the user needing to input all recent search terms into both e-commerce applications (if both are in the enabled application list). In accordance to embodiments, by saving session history of the first application into the CCP sub-cache, the second application can read that history when launched.

In accordance with embodiments, a search keyword used in a first application on the enabled application list can also be saved into a CCP sub-cache. This search keyword can be shared with other applications on the enabled application list. A user performing a search at a first website can launch a second website, which can readily perform the same search by sharing the session history from the sub-cache In accordance with embodiments, a client computing device have multiple web browsers (e.g., Chrome, Firefox, Internet Explorer, Edge, etc.) need not dedicate individual local cache to save browser history and login credentials for different websites. Rather, the browser history and login credentials for each web browser can be saved in respective sub-cache. In accordance with embodiments, a user need only login to a first web browser on the enabled application list. Subsequent login activity for that user on other web browsers can access the user's login credentials.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for enabling the use of a common cache pool by multiple applications from multiple client computing devices, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A system having a common cache pool for applications, the system comprising:
   a first computing device having a control processor configured to access executable instructions that cause the control processor to control operations of the first computing device;
   a plurality of applications executable on the first computing device, each of the plurality of applications being in a particular application category, and at least a first portion of the plurality of applications configured to utilize a cache;
   the common cache pool including a plurality of sub-caches, each of the plurality of sub-caches associated with a respective particular application category;
   a sub-portion of applications of the first portion of the plurality of applications associated with a sub-cache based on the particular application category;
   a first application of the sub-portion of applications accessing a first sub-cache when operated by a first user;
   a second application of the sub-portion of applications, when operated by the first user, accessing the first sub-cache when the first application and the second application are of the same particular application category; and
   associating authorized applications installed on one or more client computing devices with the respective sub-cache on the first computing device based on the application category of each of the authorized applications installed on the one or more client computing devices, the one or more client computing devices in communication with the first computing device across an electronic communication network; and
   moving existing content of a local cache to a respective sub-cache for each of the authorized applications installed on the one or more client computing devices based on the application category of each authorized application installed on the one or more client computing devices.

2. The system of claim 1, the first computing device being at least one of a first client computing device and an enterprise server remote from the client computing device, the first client computing device and the enterprise server in communication across the electronic communication network.

3. The system of claim 2, including:
   a plurality of second client computing devices in communication across the electronic network;
   a third application at one of the plurality of second client computing devices accessing the first sub-cache when operated by the first user if when the third application and the first application are of the same particular application category.

4. The system of claim 1, including the application association with a sub-cache is based on an enablement designation by a user.

5. The system of claim 1, including a sub-cache designated as a login credential sub-cache, the login credential sub-cache accessible by each of the sub-portion of applications that include a login security feature.

6. The system of claim 1, the first computing device including:
   a supported application list identifying applications selected according to an information technology policy;
   an installed application list identifying applications installed on the first computing device; and
   an enabled application list identifying applications of the installed application list authorized to access the common cache pool.

7. A method for accessing a common cache pool, the method comprising:
   creating in a first computing device a common cache pool having a plurality of sub-caches;
   assigning respective ones of the plurality of sub-caches to respective application categories of applications authorized to access the common cache pool sub-caches;
   associating each of the authorized applications to a respective sub-cache based on the application category;
   moving existing content of a local cache to a respective sub-cache for each authorized application resident on the first computing device based on the application category of each authorized resident application;
   associating authorized applications installed on one or more client computing devices with the respective sub-cache on the first computing device based on the application category of each of the authorized applications installed on the one or more client computing devices, the one or more client computing devices in communication with the first computing device across an electronic communication network; and moving existing content of a local cache to a respective sub-cache for each of the authorized applications installed on the one or more client computing devices based on the application category of each authorized application installed on the one or more client computing devices.

8. The method of claim 7, including:
storing session history data of a first application instantiation in a first sub-cache of the common cache pool, the first application instantiation being operated by a first user;
launching a second application instantiation by the first user;
determining if the second application is of a same application category as the first application;
if the second application is not of the same application category as the first application, assigning a second sub-cache of the common cache pool to the second application instantiation;
if the second application is of the same application category as the first application, then determining when the first application instantiation session data is to be excluded from the second application instantiation; and
based on the exclusion determination, one of excluding the first application instantiation session data from the second application instantiation and loading the first application instantiation session data into the second application instantiation.

9. The method of claim 8, including the first application instantiation launched at a first client computing device and the second application instantiation launched at a second client computing device, the first and the second client computing devices in communication across the electronic communication network.

10. The method of claim 8, including the first application and the second application being the same application located at different client computing devices.

11. The method of claim 8, basing an outcome of each of the determination steps on a predetermined security policy.

12. A non-transitory computer-readable medium having stored thereon instructions which when executed by a control processor cause the control processor to perform a method for accessing a common cache pool, the method comprising:
creating in a first computing device a common cache pool having a plurality of sub-caches;
assigning respective ones of the plurality of sub-caches to respective application categories of applications authorized to access the common cache pool sub-caches;
associating each of the authorized applications to a respective sub-cache based on the application category;
moving existing content of a local cache to a respective sub-cache for each authorized application resident on the first computing device based on the application category of each authorized resident application;
associating authorized applications installed on one or more client computing devices with the respective sub-cache on the first computing device based on the application category of each of the authorized applications installed on the one or more client computing devices, the one or more client computing devices in communication with the first computing device across an electronic communication network; and moving existing content of a local cache to a respective sub-cache for each of the authorized applications installed on the one or more client computing devices based on the application category of each authorized application installed on the one or more client computing devices.

13. The non-transitory computer-readable medium of claim 12, the instructions further configured to cause the control processor to perform the steps of:
storing session history data of a first application instantiation in a first sub-cache of the common cache pool, the first application instantiation being operated by a first user;
launching a second application instantiation by the first user;
determining if the second application is of a same application category as the first application;
if the second application is not of the same application category as the first application, assigning a second sub-cache of the common cache pool to the second application instantiation;
if the second application is of the same application category as the first application, then determining when the first application instantiation session data is to be excluded from the second application instantiation; and
based on the exclusion determination, one of excluding the first application instantiation session data from the second application instantiation and loading the first application instantiation session data into the second application instantiation.

14. The non-transitory computer-readable medium of claim 13, the instructions further configured to cause the control processor to perform the step of including the first application instantiation launched at a first client computing device and the second application instantiation launched at a second client computing device, the first and the second client computing devices in communication across the electronic communication network.

15. The non-transitory computer-readable medium of claim 13, the instructions further configured to cause the control processor to perform the step of including the first application and the second application being the same application located at different client computing devices.

16. The non-transitory computer-readable medium of claim 13, the instructions further configured to cause the control processor to perform the step of basing an outcome of each of the determination steps on a predetermined security policy.

17. The non-transitory computer-readable medium of claim 13, the instructions further configured to cause the control processor to perform the step of assigning a second sub-cache to the second application instantiation if when the second application is not of the same application category as the first application.

18. The non-transitory computer-readable medium of claim 13, the instructions further configured to cause the control processor to perform the step of designating a sub-cache as a login credential sub-cache, the login credential sub-cache accessible by each of the applications authorized to access the common cache pool sub-caches that include a login security feature.

* * * * *